Patented Apr. 3, 1934

1,953,526

UNITED STATES PATENT OFFICE 1,953,526

ABSORBENT MATERIAL

Thomas Dow Ainslie, Metuchen, and James McKeown, Woodbridge, N. J., assignors, by mesne assignments, to E. I. du Pont de Nemours and Company, a corporation of Delaware No Drawing. Application December 7, 1928, Serial No. 324,571

4 Claims. (Cl. 167—84)

This invention relates to treatment of absorbent materials, and the resulting products, and has for its object to provide improved absorbent materials in combination with a composition having available oxygen which can be readily released upon contact with moist body waste materials. Such materials are used for absorbent surgical bandages, dressings, deodorizing appliances, etc. So far as we are aware, active oxygen has not heretofore been incorporated therein in such manner as to be released only when desired and also in composition of such nature as not to be poisonous or combustible or irritating.

We have discovered that this invention is applicable to fibres treated so as to have absorbent qualities such as cellulose, wool, silk and artificial fibres. Cellulose fibres in which this invention is applicable are cotton, jute, hemp, wood pulp and absorbent products made therefrom, of which wood cotton is an example, linen, mosses, etc. Such materials can be used in the form of loose fibres, bats, pads, yarn or fabric such as gauze, and in sheet form such as paper and cardboard or matted cellulose pulp, or in the form of a cotton-like absorbent material obtained by dry disintegration of a high grade absorbent cardboard or purified matted wood pulp. These materials may be either applied directly or as filling inside of fabric such as gauze. While it has heretofore been proposed to mix in, or impregnate, such materials with agents intended to have antiseptic and deodorizing effects, a number of difficulties have arisen in producing a satisfactory and successful product. So far as we know, no product of this nature has heretofore been prepared which liberates active oxygen in use, and particularly which does not at the same time produce decomposition or by-products of an irritating or poisonous nature.

By compositions having available or active oxygen in this specification and appended claims we mean, a substance of such nature that it can release, or cause to be released, on being moistened, oxygen in such form as to be available for disinfecting, deodorizing and other antiseptic uses contemplated in this invention. Thus, sodium perborate liberates active oxygen; hypochlorites probably act indirectly to produce available or active oxygen; other compounds may act to produce hydrogen peroxide which in turn is the source of the active oxygen, etc. These compounds are capable of disinfecting or deodorizing, etc. by means of available oxygen as herein contemplated.

According to this invention we propose to combine such absorbent materials, as above named, with a relatively stable, non-irritant, chemical product which liberates, or acts by means of, active oxygen, on becoming moist or coming in contact with moisture in any form. We have discovered that chemical compounds of the nature of perborates, non-irritating peroxides, percarbonates, hypochlorites, and the like, can be used for this purpose. Some of these materials are sodium perborate, hydrogen peroxide, or hydrogen peroxide addition products, such as borax peroxide or urea peroxide, and alkaline earth peroxides, such as magnesium, calcium or zinc peroxide, sodium percarbonates, calcium hypochlorite, and the like. These materials do not release active oxygen violently in contact with moisture as is the case, for example of sodium peroxide, but, slowly and in a manner to provide efficacious treatment therewith.

The manner of incorporation of these substances will depend on the character and method of formation of the substance. Some of these materials can be incorporated in more than one way, and we do not wish to be limited to any single example given. The absorbent material can be impregnated with a solution, such as an aqueous solution, and the water or other solvent can be evaporated under conditions such as to avoid loss of active oxygen to deposit the active oxygen composition on or in the material. These active oxygen materials can also be formed in the absorbent material, as by impregnating it in succession with the reactants which produce the desired active oxygen composition in situ. Further, the composition in the form of a dry powder can be mixed with the dry pulp or dusted on or into the material, or pressed in as by rolls. In the case of those active oxygen materials which are relatively insoluble in any solvent, such as, for example, calcium peroxide, the above dry pressing or mixing methods are applicable.

For the purpose of surgical dressings, bandages, antiseptic absorbent pads, body appliances, sanitary napkins, arm pit shields, corsets and the like, we have discovered that an especially advantageous product is produced when any of the absorbent materials above mentioned are treated with the reaction mixture formed by evaporating to dryness an aqueous solution of borax and hydrogen peroxide. Variations in the ratios between borax and hydrogen peroxide give products of varying oxygen content. By evaporating to dryness a solution containing one mole of borax to 2 moles of $H_2O_2$, a solid product is obtained containing 5.36% of active oxygen. By evaporating to dryness a solution containing one mole of borax to 10 moles of H₂O₂, a dry product is obtained containing 22.72% of active oxygen. The highest active oxygen consistent with the desired commercial yield is obtained when approximately 3-5 moles of hydrogen peroxide are used per mole of borax, the oxygen content of the products obtained with such ratios running from 13 to 19% active oxygen. The most stable composition is one formed with 4 moles of hydrogen peroxide and having an oxygen content of approximately 17.5%. The series of products thus produced all contain substantially one atom of sodium to two atoms of boron. For purposes of identification and not of limitation, we call such materials borax peroxide.

The reaction forming the borax hydrogen peroxide compound of this invention is probably that shown by the following equation:

$$Na_2B_4O_7 + 4H_2O_2 \rightarrow 2[NaBO_3 \cdot H_2O_2 \cdot HBO_2] + H_2O$$

The resulting compound here specifically shown will contain approximately 20% available oxygen. Mixtures of this compound with other materials are formed as a result of the various gradations of amounts of borax relative to the hydrogen peroxide employed in any specific instance.

It is thus seen from this equation that the sodium-boron ratio is always, as stated above, 1 atom of sodium to 2 atoms of boron, regardless of what excess of borax there may be in the product, if any.

In order to obtain borax peroxide of the desired character, the evaporating stage should be carefully controlled to minimize loss of peroxide. Evaporation can be accomplished at low temperatures, and pressures below atmospheric, or, if the evaporation be rapid, such as in a film evaporator, slightly higher temperatures at atmospheric pressure can be utilized. For example, under a vacuum for a considerable period, it is desirable to maintain the temperature below 60° C.; temperatures as high as 80° C. can be utilized to give a more rapid rate of evaporation, but the oxygen loss will be somewhat higher than at 60° C. With a film evaporator where the water is removed rapidly from thin layers either at atmospheric pressure or below, the losses are not excessive up to 80° C. The evaporation should be carried out in vessels of material having no appreciable decomposing effect, such as quartz, glass, tin, or aluminum. Various hydrogen peroxide stabilizers aid in securing high yield of active oxygen by retarding the rate of decomposition of hydrogen peroxide. A small amount of magnesium silicate has a very beneficial effect on the reaction and has no deleterious action on the product.

No claim is made herein to borax peroxide nor to its method of preparation, as such a matter was not jointly invented by us.

Borax peroxide is less alkaline than sodium perborate or borax itself, being about fourteen times less alkaline than sodium perborate and about six times less alkaline than borax. It does not have irritating effects on the skin, mucous membranes, and the like, and can be made to have an active oxygen content far above that of sodium perborate.

The preparation of borax peroxide has been described above as independent of any absorbent. In preparing the absorbent materials in combination with borax peroxide, we preferably absorb borax peroxide solutions, prepared as indicated above, in the absorbent and then cause the removal of water to take place under the conditions also noted above so as to deposit borax peroxide within the material.

Thus, for example, 7.5 grams of shredded wood pulp, such as commonly used for absorbent purposes, were sprayed with 10 cc. of a solution prepared by dissolving one mole of borax in an aqueous solution containing four moles of hydrogen peroxide (100 volume H₂O₂ used) and this material dried at 40° C. for 30 hours. After drying this fibre contained 0.6 grams active oxygen or about 6.0% by weight.

A solution was made of one mole of borax and four moles of hydrogen peroxide (410 grams 100 volume H₂O₂), one part of which solution was then diluted with three parts of distilled water. 10 cc. of this solution was absorbed in a sheet of absorbent, substantially pure matted cellulose pulp, about 3 in. x 5 in., weighing 8.5 grams; the paper was then dried in an air dryer at 40° C. for about eighteen hours. The dried paper weighed 9.83 grams and contained approximately 2% of active oxygen, which accounted for 82.2% of the active oxygen available as calculated from the hydrogen peroxide used. This treatment did not impair the absorptive qualities of the paper. Fibres, bats, pads, gauze and similar absorbent materials can be treated in the same way, and absorbent paper or fabrics so treated can be comminuted to provide a desired material.

We have also prepared similar material containing upwards of 8% of active oxygen by treating 8.96 grams of matted cellulose pulp with 13.44 grams of a borax peroxide solution containing 5.1% active oxygen and then drying at 40° C. for a period of 16 hours.

The active oxygen content of the absorbent can thus be varied at will by varying the concentration in the solution or by varying the amount of solution added to the absorbent.

Cheese cloth (cotton gauze) was dipped in and saturated with a borax peroxide solution, containing 2.38% active oxygen. The gauze was removed, wrung out by hand, and then hung up in the laboratory to air-dry. After drying it contained 2.86% available oxygen by weight.

A saturated solution of sodium perborate in distilled water was prepared (2.74 grams NaBO₃.4H₂O per 100 cc. of solution). 10 cc. of this solution were added to 8.5 grams matted cellulose pulp and this dried at 40° C. for 16 hours; there was obtained a product having 0.05% active oxygen.

61 grams of 27.6% hydrogen peroxide solution was added to 100 grams of distilled water and into this was stirred 20 grams of magnesium oxide so as to form magnesium peroxide in suspension. This slurry tested 3.78% active oxygen. A piece of matted cellulose pulp paper was immersed in this slurry so as to absorb solution and magnesium peroxide. This was then dried at 40° C. for 24 hours after which it tested 1.58% available oxygen. As a variant of this method the cellulose paper could be treated with a slurry of magnesium oxide and then treated with hydrogen peroxide.

The matted wood pulp or high grade absorbent cardboard as treated above to contain active oxygen in any desired amount can be shredded or disintegrated so as to form a cotton-like absorbent material for use as a substitute for natural absorbent cotton.

The absorbent cellulose materials may be utilized in a variety of ways for the purposes specified. Thus, surgical bandages could be prepared from gauze treated with the oxygen compound as above indicated. Antiseptic pads, sanitary napkins and the like can be formed by wrapping cellulose fibres, such as those prepared from disintegrated wood pulp or pulp fibre, in gauze; either the cellulose fibres or the gauze or both could be treated with active oxygen containing composition. Other pads or body appliances could be prepared from cotton and wood pulp wool with gauze wrapping any or all of which could be treated with the active oxygen composition. Thus, for example, an absorbent pad or sanitary napkin could be prepared from the cotton-like absorbent material obtained by dry disintegration of high grade absorbent wood pulp. This material could first be treated so as to incorporate an active oxygen material therewith, and then a portion of this enveloped in a layer of less harsh natural cotton fibre and the whole wrapped in the soft gauze to hold the package together and adapted to form tying or fastening means.

For use as surgical dressings a suitable absorbent prepared as above, either as a pad or layers of gauze, could first be moistened with water and then applied, whereupon an antiseptic bandage would be formed. For other absorbent purposes, as in body appliances, the body moisture would cause antiseptic and deodorizing action to take place.

We claim:
1. A surgical bandage or like body appliance comprising a portion of absorbent cellulose material impregnated with a non-irritant, relatively stable reaction mixture containing combined sodium and boron, having a sodium-boron atomic ratio of 1:2, and having an active oxygen content of 5 to 23%.
2. A surgical bandage or like body appliance comprising a soft surgical cellulosic material having a stable non-irritant solid reaction mixture of borax and hydrogen peroxide containing from 5.3 to 22.7% active oxygen adhering to the fibers thereof.
3. A surgical bandage or like body appliance comprising an artificial absorptive cellulose product prepared from wood pulp and impregnated with the solid reaction mixture of borax and hydrogen peroxide, a less harsh portion of natural cotton surrounding said wood fiber and the whole encased in a gauze wrapping.
4. A surgical bandage or like body appliance comprising an absorbent cellulosic fibrous portion enveloped in gauze and impregnated with the reaction mixture of borax and hydrogen peroxide.

THOMAS DOW AINSLIE.
JAMES McKEOWN.